(12) United States Patent
Bigex et al.

(10) Patent No.: US 9,020,333 B2
(45) Date of Patent: Apr. 28, 2015

(54) LINE FOR TRANSPORTING A FLUID CONTAINING A HYDROCARBON, AND METHOD FOR PRODUCING SUCH A LINE

(75) Inventors: Thibaud Bigex, Pau (FR); Jérôme Woirin, Pau (FR)

(73) Assignee: Total SA, Courbevoie (FR)

( * ) Notice: Subject to any disclaimer, the term of this patent is extended or adjusted under 35 U.S.C. 154(b) by 185 days.

(21) Appl. No.: 13/641,337

(22) PCT Filed: Mar. 22, 2011

(86) PCT No.: PCT/FR2011/050602
§ 371 (c)(1),
(2), (4) Date: Oct. 15, 2012

(87) PCT Pub. No.: WO2011/128545
PCT Pub. Date: Oct. 20, 2011

(65) Prior Publication Data
US 2013/0028580 A1 Jan. 31, 2013

(30) Foreign Application Priority Data

Apr. 14, 2010 (FR) ..................... 10 52843

(51) Int. Cl.
*F24H 1/10* (2006.01)
*H05B 3/40* (2006.01)
*F16L 53/00* (2006.01)
(Continued)

(52) U.S. Cl.
CPC ............ *F16L 53/005* (2013.01); *Y10T 29/4935* (2015.01); *F16L 59/143* (2013.01); *H05B 3/48* (2013.01); *H05B 2203/021* (2013.01); *H05B 2214/03* (2013.01)

(58) Field of Classification Search
None
See application file for complete search history.

(56) References Cited

U.S. PATENT DOCUMENTS

| 4,281,238 A | 7/1981 | Noma et al. |
| 4,407,351 A | 10/1983 | Backlund |
| 5,010,440 A | 4/1991 | Endo |

(Continued)

FOREIGN PATENT DOCUMENTS

| CN | 2375842 A | 4/2000 |
| CN | 2436761 Y | 6/2001 |

(Continued)

OTHER PUBLICATIONS

Bardon, et al. "Hydrate Prevention With Electrically Heated Jumpers", Offshore Technology Conference, Apr. 30-May 3, 2007, pp. 1-8.

(Continued)

*Primary Examiner* — Thor Campbell
(74) *Attorney, Agent, or Firm* — Patterson Thuente Pedersen, P.A.

(57) ABSTRACT

The invention relates to a line for transporting a hydrocarbon. The line includes a hollow inner tube extending in a longitudinal direction for transporting the fluid in the inner tube and having an electrically insulating outer surface. A heating layer is arranged on the inner tube and comprises carbon fibers embedded in a polymer material. A heat insulation layer is arranged around the heating layer. An outer tube is arranged around the heat insulation layer. The outer tube is designed to resist an outer pressure at least higher than 100 bar. Spacing means hold the outer tube at a distance from the inner tube in a fixed manner. Power supply means feed an electric current to the heating layer in order to heat the inner tube.

13 Claims, 2 Drawing Sheets

(51) Int. Cl.
*F16L 59/14* (2006.01)
*H05B 3/48* (2006.01)

(56) References Cited

U.S. PATENT DOCUMENTS

| | | | | |
|---|---|---|---|---|
| 5,394,507 | A * | 2/1995 | Okamoto | 392/480 |
| 6,605,168 | B1 | 8/2003 | Bleibler et al. | |
| 6,772,840 | B2 * | 8/2004 | Headworth | 166/302 |
| 6,939,082 | B1 | 9/2005 | Baugh | |
| 7,268,562 | B2 * | 9/2007 | Aisenbrey | 324/543 |
| 7,628,943 | B2 | 12/2009 | Blackmore et al. | |
| 2003/0056954 | A1 * | 3/2003 | Headworth | 166/302 |
| 2003/0213556 | A1 | 11/2003 | Blackmore et al. | |
| 2006/0102615 | A1 | 5/2006 | Carriere | |
| 2006/0196568 | A1 * | 9/2006 | Leeser et al. | 138/149 |
| 2008/0063478 | A1 | 3/2008 | Reddy | |
| 2008/0066822 | A1 | 3/2008 | Varkey et al. | |
| 2008/0272110 | A1 | 11/2008 | Kamiyama et al. | |
| 2009/0000681 | A1 | 1/2009 | Averbuch et al. | |
| 2009/0205737 | A1 | 8/2009 | Dinon et al. | |
| 2010/0209085 | A1 * | 8/2010 | Ellis et al. | 392/468 |
| 2011/0008030 | A1 * | 1/2011 | Luo et al. | 392/465 |
| 2011/0052328 | A1 * | 3/2011 | Frerich et al. | 405/224.2 |
| 2013/0108250 | A1 * | 5/2013 | Bigex et al. | 392/468 |

FOREIGN PATENT DOCUMENTS

| | | |
|---|---|---|
| CN | 2456001 Y | 10/2001 |
| CN | 2475967 Y | 2/2002 |
| CN | 1353309 A | 6/2002 |
| CN | 2504482 Y | 8/2002 |
| CN | 2643131 Y | 9/2004 |
| CN | 2720443 Y | 8/2005 |
| CN | 1695929 A | 11/2005 |
| CN | 2775451 Y | 4/2006 |
| CN | 2800021 Y | 7/2006 |
| CN | 200941686 Y | 8/2007 |
| CN | 101275691 A | 10/2008 |
| CN | 201191920 Y | 2/2009 |
| CN | 101529148 A | 9/2009 |
| CN | 201354918 Y | 12/2009 |
| EP | 0 312 204 A2 | 4/1989 |
| EP | 1 367 859 A2 | 12/2003 |
| EP | 1 912 006 A2 | 4/2008 |
| EP | 2009338 A1 | 12/2008 |
| FR | 2873952 A1 | 2/2006 |
| FR | 2913364 A1 | 9/2008 |
| GB | 2 182 413 A | 5/1987 |
| GB | 2 247 507 A | 3/1992 |
| GB | 2 446 506 A | 8/2008 |
| JP | 2005324367 A | 11/2005 |
| WO | WO 96/05386 A1 | 2/1996 |
| WO | WO 97/31507 A1 | 8/1997 |
| WO | WO 97/40309 A1 | 10/1997 |
| WO | WO 99/06652 | 2/1999 |
| WO | WO 99/67561 A1 | 12/1999 |
| WO | WO 01/42338 A2 | 6/2001 |

OTHER PUBLICATIONS

Application and File history for U.S. Appl. No. 13/641,328, filed Nov. 26, 2012. Inventors: Thibaud Bigex et al.
Application and File history for U.S. Appl. No. 13/641,344, filed Nov. 26, 2012. Inventors: Thibaud Bigex et al.
Notice of Allowance and Examiner's Amendment from related U.S. Appl. No. 13/641,352 dated Dec. 26, 2013, 10 pgs.
Application and File history for U.S. Appl. No. 13/641,352, filed Oct. 15, 2012. Inventors: Thibaud Bigex et al.

* cited by examiner

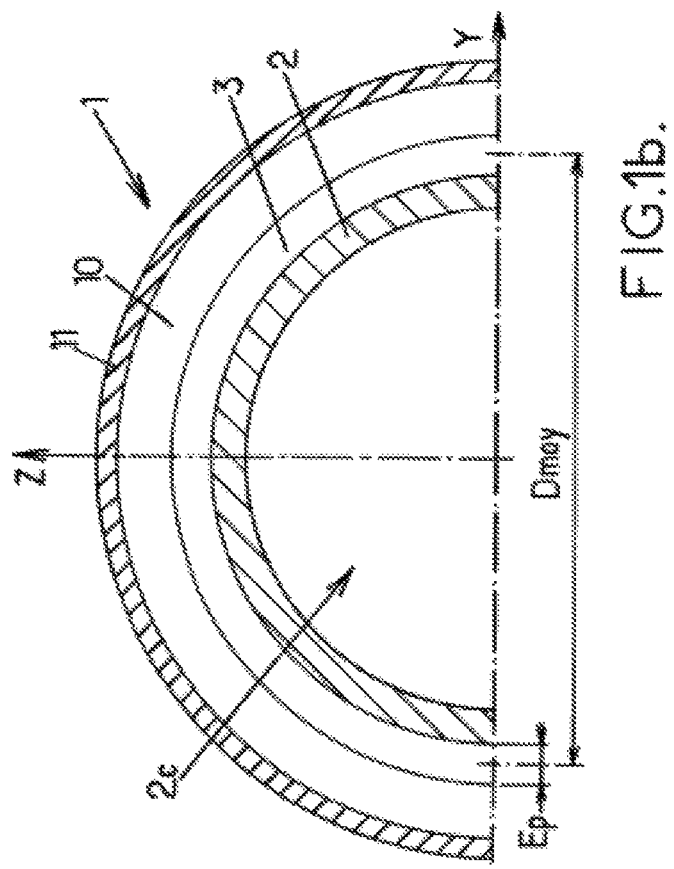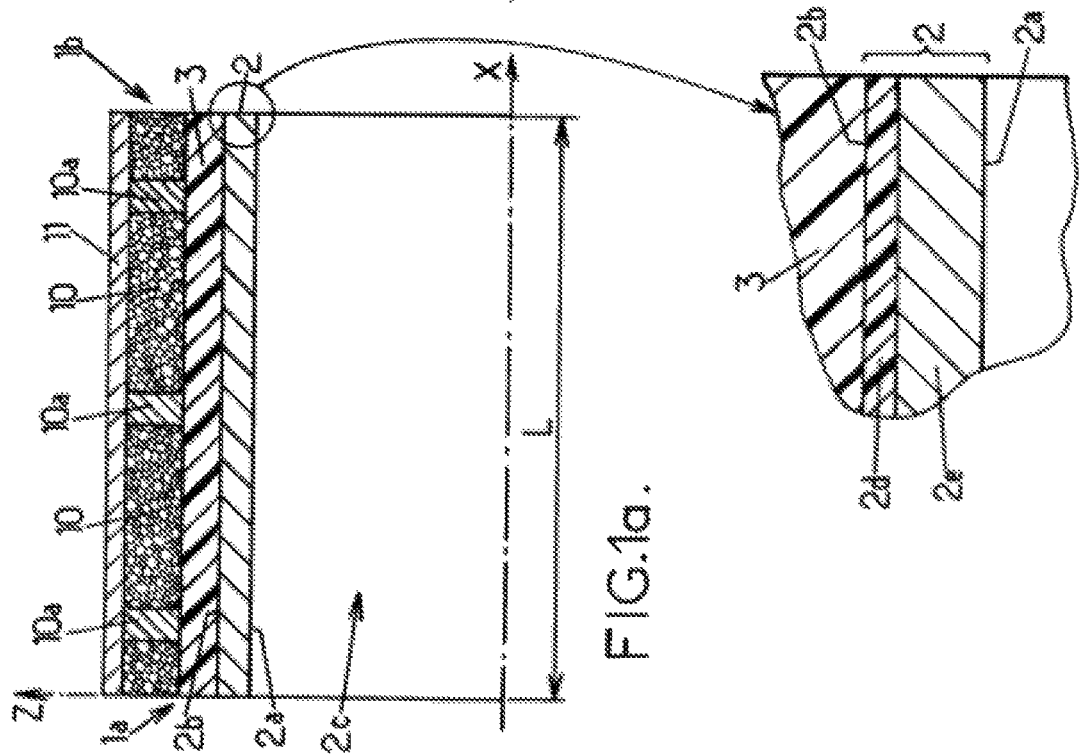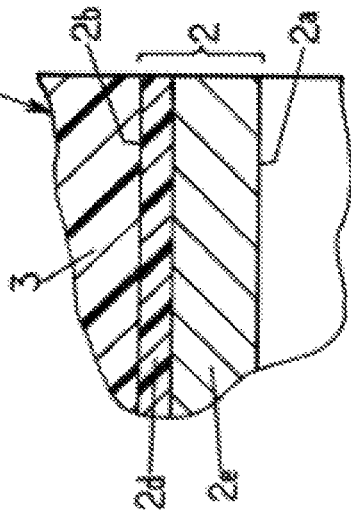

LINE FOR TRANSPORTING A FLUID CONTAINING A HYDROCARBON, AND METHOD FOR PRODUCING SUCH A LINE

PRIORITY CLAIM

The present application is a National Phase entry of PCT Application No. PCT/FR2011/050602, filed Mar. 22, 2011, which claims priority from French Application No. 1052842, filed Apr. 14, 2010, the disclosures of which are hereby incorporated by reference herein in their entirety.

FIELD OF THE INVENTION

This invention relates to lines for transporting a fluid containing a hydrocarbon.

BACKGROUND OF THE INVENTION

Fluid lines for hydrocarbons are now commonly used in very cold environments on land and at sea, sometimes at very great depths underwater. Under such conditions, the fluid may freeze or congeal or paraffin formation may occur. These fluid reactions can cause plugging and interfere with fluid transport in the line. That is why such lines are sometimes heated to prevent these problems. One known technique is electrical heating of such lines by copper conductors placed on the tubes.

Documents CN2436761-Y and CN201354918-Y describe lines for transporting a hydrocarbon having a carbon fiber layer suitable to be supplied with electricity to heat the line.

Such lines using carbon fibers as an electrical conductor heat the fluid more efficiently than copper conductors.

The object of this invention is to perfect these types of lines, and in particular to improve their resistance to external pressure.

SUMMARY OF THE INVENTION

A line for transporting a fluid containing a hydrocarbon according to one embodiment of the invention includes:
- a hollow inner tube extending in a longitudinal direction and intended for transporting said fluid in the inner tube, said inner tube having at least one electrically insulating outer surface,
- a heating layer on the inner tube, and comprising carbon fibers embedded in a polymer material,
- a heat insulation layer around the heating layer,
- an outer tube around the heat insulation layer, said outer tube being suitable to withstand an external pressure at least greater than 100 bar,
- spacing means placed between the inner tube and the outer tube to securely hold the outer tube at a distance from the inner tube, and
- electrical power supply means intended to bring an electrical current to said heating layer, said electrical current flowing in said heating layer in order to heat the inner tube.

With these arrangements, in particular the fact of using an outer tube around the heat insulation layer and spacing means, the line can withstand high external pressures greater than 100 bar, so that such a line can be used offshore at great depths.

In various embodiments of the line according to the invention, one or more of the following arrangements may optionally be used:

- the outer tube comprises carbon fibers embedded in a polymer material;
- the carbon fibers of the heating layer are wound around the inner tube with a first predetermined angle suitable to obtain an electrical resistance of said heating layer, and the carbon fibers of the outer tube are wound around the inner tube with at least a second predetermined angle suitable to obtain a mechanical strength of said outer tube;
- the spacing means comprise a reinforcing filler embedded in a polymer material, said spacing means being formed on the inner tube and the heating layer;
- the electrical power supply means comprise a connection element coming into contact with at least one substantially transverse or partially angled contact surface located in proximity to one end of the heating layer in the longitudinal direction.

The invention also relates to a method for producing a line for the transport of a fluid containing a hydrocarbon, said line comprising a hollow inner tube extending in a longitudinal direction and intended for transporting said fluid in the inner tube, said inner tube having at least one electrically insulating outer surface, said method comprising at least the following steps:
- formation of a heating layer on the inner tube, said heating layer comprising carbon fibers embedded in a polymer material,
- placement of a heat insulation layer around the heating layer,
- placement of spacing means,
- placement of an outer tube around the heat insulation layer, said outer tube being suitable to withstand an external pressure at least greater than 100 bar, and said spacing means being placed between the inner tube and the outer tube to securely hold the outer tube at a distance from the inner tube, and
- placement of electrical power supply means for bringing an electrical current to said heating layer, said electrical current flowing in said heating layer to heat the inner tube.

In various embodiments of the method for producing the line according to the invention, one or more of the following arrangements may optionally be used:
- the formation of the heating layer is achieved by winding carbon fibers around the inner tube at a first predetermined angle suitable to obtain an electrical resistance of said heating layer;
- the spacing means comprise a reinforcing filler embedded in a polymer material, and said spacing means are formed directly on the inner tube and the heating layer after formation of the heating layer;
- the outer tube is formed from carbon fibers embedded in a polymer material, directly on the spacing means;
- the outer tube is formed by winding carbon fibers around the spacing means and the heat insulation layer with at least a second predetermined angle suitable to obtain a mechanical strength of said outer tube.

BRIEF DESCRIPTION OF THE DRAWINGS

Other features and advantages of this invention will become apparent from the following description of one of its embodiments, given as a non-limiting example, with reference to the attached drawings.

In the drawings:

FIG. 1*a* is a longitudinal cross-sectional view of a line according to the invention, FIG. 1*b* is a transverse side view of the line from FIG. 1*a*, FIG. 2 is an enlarged view of a variant of the heating layer of the line from FIG. 1.

In the various figures, the same references designate identical or similar elements.

DETAILED DESCRIPTION OF THE DRAWINGS

Figure 3:
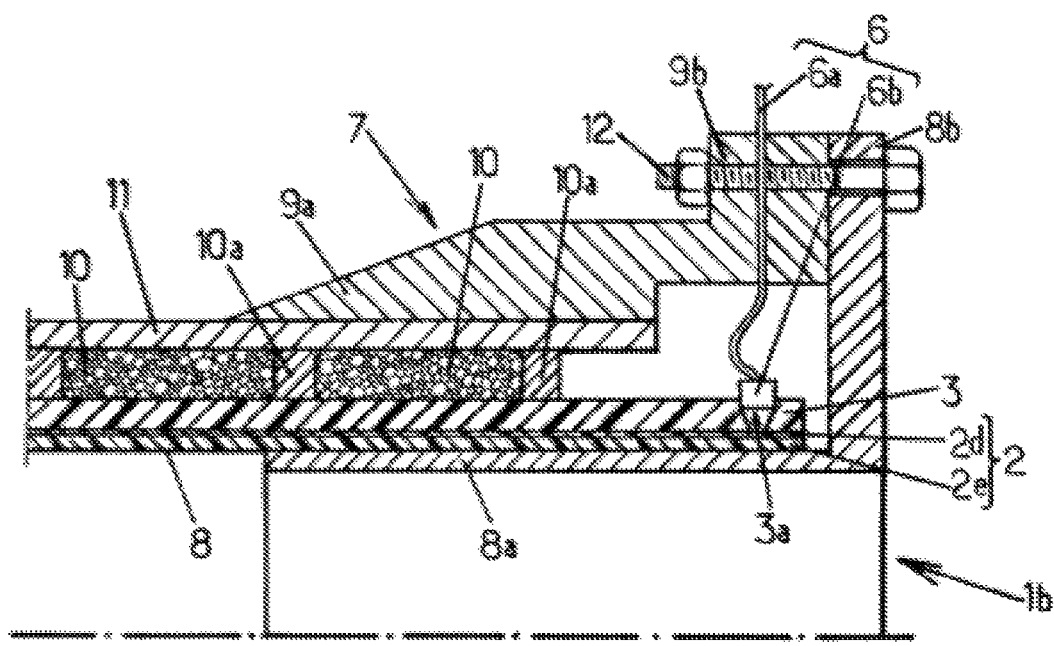
FIG. 3 is a longitudinal cross-sectional view of one end of the line from FIG. 1 and showing the power supply and assembly means.

The longitudinal direction mentioned in this description should be understood as the direction going in the direction X designated on the figures. A transverse direction mentioned in this description should be understood as the direction Y or Z designated on the figures. These directions are mentioned only to assist with reading and understanding the invention.

The term "line" in this invention should be understood as a device comprising a tube for transporting a fluid between at least an inlet and an outlet, said device possibly comprising other elements, such as a valve or multiple bypasses.

FIGS. 1a and 1b show a line 1 according to the invention in a longitudinal cross-section in plane XZ and in a transverse cross-section in plane YZ. In these figures, only an upper half above the X axis is shown, the lower half being substantially identical by symmetry with the X axis.

The line 1 comprises a hollow inner tube 2, extending in the longitudinal direction of the X axis between a first and second end (1a, 1b) of the line. This inner tube 2 comprises an inner surface 2a in proximity to the X axis, and an outer surface 2b farther from the X axis. Inside the inner surface 2a, there extends a cavity 2c between an inlet and an outlet of the cavity located at each end. The cavity 2c is suitable for transporting the fluid between said inlet and outlet.

FIG. 1b shows that line 1 has a substantially cylindrical shape, but other forms could be implemented.

The inner tube 2 can be made with an electrically insulating material, for example a polymer. This material may advantageously be a polyamide (PA) or a polyvinylidene difluoride (PVDF).

The inner tube 2 can also be made with an electrically conductive material, for example steel. In that case, it will comprise, at least on its outer surface 2b, an electrically insulating layer 2d visible in FIG. 2, for example composed of one of the polymers mentioned above, or a composite comprising fiberglass or Kevlar fibers embedded in a polymer material of the same type mentioned above. This electrically insulating layer 2d has a thickness in a transverse direction, for example between 0.5 mm and 10 mm, in particular as a function of the voltage V of the heating layer.

At least a heating layer 3 and a heat insulation layer 10 are applied on this inner tube 2 of the line 1, spacing means 10a are placed or formed, and an outer tube 11 is placed or formed on said spacing means 10a.

The heating layer 3 is a composite comprising at least carbon fibers embedded in a polymer. This polymer may advantageously be a polyamide (PA) or a polyvinylidene difluoride (PVDF).

Carbon fibers are capable of conducting an electrical current to heat the tube by Joule effect. The electrical resistance R of such a heating layer 3 between the first and second ends (1a, 1b) of the line can be approximated with the following formula:

$$R = \rho_{fibre} \cdot \frac{L}{\pi \cdot D_{moy} \cdot \cos^2\alpha \cdot E_p}$$

where:

$\rho_{fibre}$ is a resistivity of the carbon fibers, having for example $\rho_{fibre}=1,9.10^{-5}$ Ωm as a value at a temperature of 20° C., which is substantially 1100 times more resistive than copper at 20° C., L is a length of the heating layer 3 between the first and second ends (1a, 1b) in the longitudinal direction X, $D_{moy}$ is a mean diameter of the heating layer 3, $E_p$ is a thickness of the heating layer in a transverse direction, and α is an angle of inclination formed by the carbon fibers relative to the direction of the X axis.

The thickness $E_p$ and the angle of inclination α make it possible, when sizing, to define the electrical resistance of the heating layer 3, and therefore the electrical power P consumed to heat the tube 2. That electrical power P is equal to $P=V^2/R$, where V is an electrical voltage supplied to said heating layer 3 between the first and second ends.

The angle of inclination α can assume any value between 0 degrees and 70 degrees. However, for ease of manufacturing and because of the risk of delamination of the composite when bending the line 1 (for example, during placement on the seabed) when a low value is used for the angle of inclination, this angle of inclination α will advantageously be greater than 10 degrees.

For an angle of inclination range of between 10 degrees and 70 degrees, the coefficient $\cos^2\alpha$ substantially varies between 0.12 and 0.97, which means that the electrical resistance R of the heating layer 3 may vary over a very wide range by defining only this angle of inclination α of the carbon fibers.

The heating layer 3 can be manufactured by known means of the type presented in publication FR-2,873,952, using preformed strips of composite, each strip extending in a main direction and comprising carbon fibers embedded in a polymer, said carbon fibers being oriented substantially in said main direction of the preformed strip.

The heating layer 3 can be made of a stack of sub-layers, each sub-layer comprising carbon fibers angled at a predetermined angle of inclination $\alpha_i$ relative to the longitudinal direction X. Each sub-layer thus comprises carbon fibers with an angle of inclination that differs from the adjacent sub-layer. For example, each sub-layer is formed using preformed strips, as explained above. As a variant, two successive sub-layers can have opposite angles of inclination to form a grid in the shape of rhombi when viewed from an outer surface of the heating layer 3.

Each sub-layer of index i as an angle of inclination $\alpha_i$, a thickness $E_{pi}$, a mean diameter $D_{moyi}$, and has a basic electrical resistance $R_i$. The basic electrical resistance $R_i$ of each sub-layer of index i can be calculated by the above formula for a layer having carbon fibers at a single angle of inclination. The electrical resistance R of the heating layer 3 can then be calculated by placing the basic resistances $R_i$ of each sub-layer in parallel, i.e., with $$1/R = \sum_i 1/R_i.$$

With the angle of inclination of the carbon fibers in the heating layer 3, the desired electrical resistance R can be obtained for heating.

With this heating layer 3 comprising carbon fibers properly distributed in the polymer material, the heating is more even around the tube 2. In addition, if one or more carbon fibers are broken somewhere on the line, the electrical current continues to flow. Also, if a plurality of sub-layers with different angles is used, then the carbon fibers intersect and are at least partially in mutual contact, such that the electrical current and the heating remain uniform in the heating layer 3. Only the area where the fibers are broken is affected. Such a line 1 is thus very tolerant of manufacturing defects and handling accidents that can result in localized damage.

Spacing means 10a are placed periodically along the line 1 in the longitudinal direction X. Their function is to securely hold the outer tube 11 at a distance from the inner tube 2 and to protect the heat insulation layer 10 from high external pressure outside the line 1.

They consist, for example, of annular elements extending radially from the heating layer 3 towards the outer tube 11, substantially in a transverse plane perpendicular to the longitudinal direction X.

These spacing means 10a may be a composite comprising a reinforcing filler embedded in a polymer material, formed on the inner tube 2 and the heating layer 3. The reinforcing filler may comprise fiberglass or Kevlar fibers to increase the mechanical strength of said spacing means.

Alternatively, they consist of one or more elements extending longitudinally and radially from the heating layer 3 towards the outer tube 11. In this arrangement, these spacing means 10a may be extruded or on the inner tube 2 equipped with the heating layer 3.

The heat insulation layer 10 may be preformed in the form of wide strips of material suitable to be mounted between said spacing means 10a: The width of each strip is substantially the same as the distance between each spacing means 10a in the longitudinal direction X, and its length is the same as the outer circumference of the heating layer 3. Each insulation layer strip 10 is then mounted by winding it around the heating layer 3 between each spacing means 10a. The insulation layer strips 10 are composed for example of a highly heat insulating material such as polyurethane (PU) foam.

As a variant, this heat insulation layer 10 is injected by an injection means into cavities delimited by the heating layer 3, the spacing means 10a, and the outer tube 11. Optionally, the spacing means 10a comprise openings in the longitudinal direction such that the successive cavities communicate with one another, and the material of the insulating layer 10 can be injected by said injection means into all cavities. In such a case, the material of the insulating layer 10 is advantageously a foam, such as a polyurethane (PU) foam.

The outer tube 11 may be made of steel or a composite comprising carbon fibers and a polymer such as a polyamide (PA) or a polyvinylidene difluoride (PVDF).

The outer tube 11 may advantageously comprise a composite comprising at least one reinforcing filler embedded in a polymer, the reinforcing filler comprising at least carbon fibers. It is advantageous to use the same polymer for the heating layer 3, the spacing means 10a, and the outer tube. The inner tube 2 is also advantageously made of that same polymer. The line 1 is a multilayer composite comprising a polymer such as a polyamide (PA) or a polyvinylidene difluoride (PVDF). It is then possible to produce such a line in a very long length and in a fully automated manner. With this arrangement, the cost of such a line is low, even if it comprises an expensive material such as carbon fiber.

The outer tube 11 can be manufactured with the same technique as for the heating layer 3. It may include a plurality of sub-layers, each sub-layer comprising carbon fibers angled at a predetermined angle of inclination. Furthermore, each sub-layer may be formed using preformed strips. Additionally, the angle of inclination of a sub-layer has a value opposite to the angle of inclination of a neighboring or adjacent sub-layer. The angle of inclination of these sub-layers is thus advantageously between 20 degrees and 70 degrees.

With the outer tube 11, the line 1 is very rigid. It can bear very high external pressure, for example greater than 100 bar and preferably greater than 200 bar. For better resistance to external pressure, the angle of inclination will advantageously be between 60 and 70 degrees, and preferably close to 65 degrees.

With the outer tube 11, the line 1 is also resistant to very high compressive forces. For better compressive or tensile strength in the longitudinal direction X, the angle of inclination will advantageously be between 20 and 30 degrees, and preferably close to 25 degrees.

The line 1 is also resistant to very high bending forces. It can be wound with a small radius of curvature, for example less than 20 m, and preferably less than 10 m. An angle of inclination of between 50 and 70 degrees will be preferred for obtaining a small radius of curvature. The line can then be used in deep sea without the risk of being damaged during installation, whether using the "S-lay" or "J-lay" technique in which the line forms one or more bends before resting on the seabed.

With the angle of inclination of the carbon fibers in the outer tube 11, a desired mechanical resistance can be obtained for the line against pressure, longitudinal compression or tension, or bending stress.

With the very rigid outer tube 11, the inner tube 2 may have a small thickness and be made of a less rigid material, meaning it is only able to support the manufacture of successive layers on said inner tube 2 and not the stresses of external pressure on the line 1. The heating layer 3 is then a short distance from the inner surface 2a of the tube 2 and the heating of the transported fluid is more efficient. In addition, less power is required for heating the fluid. For example, a tube 6 inches in diameter (approximately 15 cm in diameter), comprising 54 layers of carbon fibers embedded in a Polyamide PA11 polymer with first sub-layers having ±25 degree angles of inclination and second sub-layers having ±65 degree angles, said sub-layers representing a thickness of 15 mm, has the following mechanical properties: resistance to external pressure of 245 bar, resistance to internal fluid pressure of 1500 bar, and tensile strength of 550 metric tons.

FIG. 3 shows one embodiment of an end 1b of the line according to the invention, comprising:

electrical power supply means 6 for the heating layer 3, intended to bring electrical current to the heating layer 3, and mechanical assembly means 7 for the line, intended to connect it with another device or with another line comprising identical or complementary assembly means.

Each end 1a, 1b of the line 1 comprises an electrical power supply means, such that a voltage V applied between the two electrical power supply means causes an electrical current I to flow in the heating layer 3. By Ohm's law, we have: I=V/R.

The electrical power supply means 6 shown comprise a cable 6a in relation to the outside of the line 1, and a connection element 6b coming into contact with the carbon fibers of the heating layer 3 and connected to said cable 6a.

According to a first variant (not shown), the connection element 6b is in contact with the carbon fibers of the heating layer 3 on a transverse contact surface of said heating layer 3, said contact surface being substantially perpendicular to the longitudinal direction X and located at one longitudinal end of said heating layer 3. This contact surface is substantially annular.

According to a second variant, shown in FIG. 3, the connection element 6b has a beveled shape in a longitudinal cross-section, and enters a groove 3a of the heating layer 3 to come into contact with the carbon fibers of the heating layer 3 on a contact surface at least partially angled in said groove 3a. The connection element 6b and the groove 3a have an annular shape around the longitudinal axis X. The groove 3a is located in proximity to one end of the heating layer in the longitudinal direction.

With this arrangement, the contact surface between the connection element 6b and the heating layer 3 is increased.

Assembly means 7 are shown in FIG. 3. These assembly means 7 comprise for example:
- a first part 8 connected to the tube 2, comprising for example a longitudinal portion 8a fastened to the tube 2 extending in the longitudinal direction X, then a radial portion 8b extending outwardly, and
- a second part 9 comprising a longitudinal portion 9a mounted to be fluid-tight on an outer surface of the line 1, and a radial portion fastened to the radial portion 8b of the first part 8 by clamping means 12 such as bolts.

These assembly means 7 may also be suitable for holding the power supply means 6 of the heating layer 3.

The line 1 may comprise a temperature sensor intended to be connected to control means for regulating the electrical current in the heating layer 3.

The temperature sensor may comprise an optical fiber suitable for measuring a temperature profile along the line 1 in the longitudinal direction X. The control means thus receives a plurality of temperature measurements, each measurement corresponding to a different position along the line 1 in the longitudinal direction X.

The optical fiber may be embedded in the heating layer 3.

Advantageously, the inner tube 2 will be made of polymer and the temperature sensor or the optical fiber will be embedded in the inner tube 2, so that the temperature sensor measures at least one temperature between the heating layer 3 and the inner surface 2a of the tube 2. Such a measurement closer to the fluid gives more representative information for the regulation of the control means.

The line 1 may be manufactured by the following method.

Said line comprises a hollow inner tube 2 extending in a longitudinal direction X and intended for transporting the fluid in the tube, said inner tube 2 having at least one electrically insulating outer surface 2a.

The method comprises at least the following steps:
- formation of a heating layer 3 on the tube, said heating layer 3 comprising carbon fibers embedded in a polymer material,
- placement of a heat insulation layer 10 around the heating layer 3,
- placement of spacing means 10a,
- placement of an outer tube 11 around the heat insulation layer 10, said outer tube 11 being suitable to withstand an external pressure at least greater than 100 bar, and said spacing means being placed between the inner tube 2 and the outer tube 11 to securely hold the outer tube 11 at a distance from the inner tube 2, and
- placement of electrical power supply means 6 for bringing an electrical current to said heating layer 3, said electrical current flowing in said heating layer to heat the inner tube.

The tube 2 can be formed by extrusion of a polymer type material.

The formation of the heating layer 3 may be achieved by winding carbon fibers around the inner tube 2 at a first predetermined angle suitable to obtain an electrical resistance of said heating layer 3. For that purpose, preformed composite strips will be used, wound around the inner tube 2 then heated to partially melt the polymer and adhere to the inner tube. The spacing means 10a comprises a reinforcing filler embedded in a polymer material.

They may be formed directly on the inner tube 2 and the heating layer 3 after the formation of the heating layer 3, by any process, for example such as molding, extrusion, or coextrusion.

The outer tube 11 may be formed directly on the spacing means 10a, from carbon fibers embedded in a polymer material. Preformed composite strips may also be used, wound around the spacing means 10a, then heated to partially melt the polymer and adhere to said spacing means.

The carbon fibers of the outer tube may optionally be wound with at least one predetermined angle suitable to achieve a mechanical strength of the outer tube 11, such that said outer tube withstands an external pressure for example greater than 100 bar and preferably greater than 200 bar.

Finally, the line 1 may be made using a continuous production process in which the inner tube 2 is extruded, the heating layer 3 is formed on the tube, spacing means 10a are extruded onto the heating layer 3 while forming longitudinal cavities, a heat insulating material is injected into said cavities, and the outer tube 11 is formed on the spacing means.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention.

Likewise, the various features described above should all be regarded as example embodiments, rather than limitations to the scope or spirit of the invention. Therefore, the above is not contemplated to limit the scope of the present invention.

The invention claimed is:

1. A line for transporting a fluid containing a hydrocarbon, said line comprising:
   - a hollow inner tube extending in a longitudinal direction and intended for transporting said fluid in the inner tube, said inner tube having at least one electrically insulating outer surface,
   - a heating layer on the inner tube and comprising carbon fibers embedded in a polymer material,
   - a heat insulation layer around the heating layer,
   - an outer tube around the heat insulation layer, said outer tube comprising carbon fibers embedded in a polymer material and being suitable to withstand an external pressure at least greater than 100 bar,
   - spacing means placed between the inner tube and the outer tube to securely hold the outer tube at a distance from the inner tube, electrical power supply means intended to bring an electrical current to said heating layer, said electrical current flowing in said heating layer to heat the inner tube, and wherein the carbon fibers of the heating layer are wound around the inner tube with a first predetermined angle suitable to obtain an electrical resistance of said heating layer.

2. The line according to claim 1, wherein:
the carbon fibers of the outer tube are wound around the inner tube with at least a second predetermined angle suitable to obtain a mechanical strength of said outer tube.

3. The line according to claim 1, wherein the spacing means comprises a reinforcing filler embedded in a polymer material, said spacing means being formed on the inner tube and the heating layer.

4. The line according to claim 1, wherein the electrical power supply means comprises a connection element coming into contact with at least one substantially transverse or partially angled contact surface located in proximity to one end of the heating layer in the longitudinal direction.

5. A method for producing a line for the transport of a fluid containing a hydrocarbon, said line comprising a hollow inner tube extending in a longitudinal direction and intended for transporting said fluid in the tube, said inner tube having at least one electrically insulating outer surface, said method comprising at least the following steps:
    forming a heating layer on the inner tube, said heating layer comprising carbon fibers embedded in a polymer material,
    placing a heat insulation layer around the heating layer,
    placing a spacing means around the inner tube,
    placing an outer tube around the heat insulation layer, said outer tube being suitable to withstand an external pressure at least greater than 100 bar, and said spacing means being placed between the inner tube and the outer tube to securely hold the outer tube at a distance from the inner tube, and
    placing an electrical power supply for bringing an electrical current to said heating layer, said electrical current flowing in said heating layer to heat the inner tube.

6. The method according to claim 5, wherein forming of the heating layer is achieved by winding carbon fibers around the inner tube at a first predetermined angle suitable to obtain an electrical resistance of said heating layer.

7. The method according to either of claim 5, wherein the spacing means comprises a reinforcing filler embedded in a polymer material, and said spacing means are formed directly on the inner tube and the heating layer after the formation of the heating layer.

8. The method according of claim 5, wherein the outer tube is formed from carbon fibers embedded in a polymer material, directly on the spacing means.

9. The method according to claim 5, wherein the outer tube is formed by winding carbon fibers around the spacing means and the heat insulation layer with at least a second predetermined angle suitable to obtain a mechanical strength of said outer tube.

10. The line according to claim 1, wherein the electrical resistance of the heating layer is determined by the following formula:

$$R = \rho_{fibre} \cdot \frac{L}{\pi \cdot D_{moy} \cdot \cos^2\alpha \cdot E_p}$$

Where:
    $\rho_{fibre}$ is a resistivity of the carbon fibers,
    L is a length of the heating layer in the longitudinal direction,
    $D_{moy}$ is a mean diameter of the heating layer,
    $E_p$ is a thickness of the heating layer in a transverse direction, and
    α is the first predetermined angle of inclination formed by the carbon fibers relative to the longitudinal direction.

11. The line according to claim 1, wherein the first predetermined angle is comprised in a range of between 10 degrees and 70 degrees.

12. The line according to claim 1, wherein the heating layer is a stack of sub-layers, each sub-layer comprising carbon fibers angled at a predetermined angle of inclination $\alpha_i$ relative to the longitudinal direction, and each sub-layer comprises carbon fibers with an angle of inclination that differs from the adjacent sub-layer.

13. The line according to claim 3, wherein two successive sub-layers in the stack of sub-layers have opposite angles of inclination.

* * * * *